United States Patent
Sui et al.

(10) Patent No.: US 11,553,423 B2
(45) Date of Patent: Jan. 10, 2023

(54) SIGNALING INDICATION TO REDUCE POWER CONSUMPTION FOR MTC DEVICES

(71) Applicant: Telefonaktiebolaget LM Ericsson (publ), Stockholm (SE)

(72) Inventors: Yutao Sui, Solna (SE); Johan Bergman, Stockholm (SE); Andreas Höglund, Solna (SE); Olof Liberg, Stockholm (SE); Xingqin Lin, Santa Clara, CA (US); Yi-Pin Eric Wang, Fremont, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 111 days.

(21) Appl. No.: 16/493,181

(22) PCT Filed: Mar. 23, 2018

(86) PCT No.: PCT/SE2018/050307
§ 371 (c)(1),
(2) Date: Sep. 11, 2019

(87) PCT Pub. No.: WO2018/174805
PCT Pub. Date: Sep. 27, 2018

(65) Prior Publication Data
US 2020/0077338 A1    Mar. 5, 2020

Related U.S. Application Data

(60) Provisional application No. 62/476,197, filed on Mar. 24, 2017.

(51) Int. Cl.
*H04W 52/02*    (2009.01)
(52) U.S. Cl.
CPC ............................ *H04W 52/0229* (2013.01)

(58) Field of Classification Search
CPC ... H04W 52/0229; Y02D 70/21; Y02D 70/24; Y02D 30/70; Y02D 70/00; Y02D 70/1262; Y02D 70/1264; Y02D 70/02
See application file for complete search history.

(56) References Cited

U.S. PATENT DOCUMENTS

| 2012/0093112 A1 | 4/2012 | Qu et al. |
| 2012/0213137 A1 | 8/2012 | Jeong et al. |
| (Continued) | | |

FOREIGN PATENT DOCUMENTS

| CN | 101282295 A | 10/2008 |
| CN | 103249121 A | 8/2013 |
| (Continued) | | |

OTHER PUBLICATIONS

Notice of Preliminary Rejection issued by the Korean Intellectual Property Office for Patent Application No. 10-2019-7027888— dated Apr. 23, 2020.

(Continued)

*Primary Examiner* — Derrick V Rose
(74) *Attorney, Agent, or Firm* — Baker Botts, LLP

(57) ABSTRACT

A method for a user equipment, a method for a network equipment, a user equipment and a network equipment is disclosed. The network equipment transmits a signal pertaining to if control information is present in a first time period while the user equipment determines if a signal pertaining to control information is present in a first time period. The network equipment transmits control information to a UE in accordance with the transmitted signal while the user equipment decides whether to attempt to decode the control information depending on the determination.

4 Claims, 7 Drawing Sheets

(56) References Cited

U.S. PATENT DOCUMENTS

| | | | |
|---|---|---|---|
| 2012/0275364 A1 | 11/2012 | Anderson et al. | |
| 2013/0148623 A1 | 6/2013 | Nishio et al. | |
| 2015/0230173 A1* | 8/2015 | Li | H04W 52/0229 370/311 |
| 2017/0289899 A1* | 10/2017 | You | H04W 88/08 |
| 2018/0102890 A1* | 4/2018 | Yi | H04L 5/0053 |
| 2018/0115968 A1* | 4/2018 | Dallal | H04L 5/0053 |
| 2020/0404635 A1* | 12/2020 | Bendlin | H04L 5/0053 |

FOREIGN PATENT DOCUMENTS

| | | |
|---|---|---|
| CN | 103297195 A | 9/2013 |
| CN | 103493549 A | 1/2014 |
| CN | 104349431 A | 2/2015 |
| CN | 106454901 A | 2/2017 |
| JP | 2015 523757 A | 8/2015 |
| JP | 2016 506667 A | 3/2016 |
| KR | 2001 0072805 A | 7/2001 |
| KR | 2012 0095805 A | 8/2012 |
| WO | 2016 004560 A1 | 1/2016 |
| WO | 2017 025484 A1 | 2/2017 |

OTHER PUBLICATIONS

Korean Patent Decision issued for Patent customer No. 5199870l505l—dated Oct. 21, 2020.
Notice of Reasons for Rejection issued for JP Patent Application No. 2019-552247—dated Jan. 28, 2021.
3GPP TSG RAN WG1 Meeting #86; Gothenburg, Sweden; Source: Qualcomm Incorporated; Title: Power consumption reduction techniques for eMTC (R1-167612)—Aug. 22-26, 2016.
3GPP TSG RAN WG1 Meeting #88; Athens, Greece; Source: CATT; Title: on sDCI design (R1-1702048)—Feb. 13-17, 2017.
3GPP TSG RAN Meeting #75; Dubrovnik, Croatia; Source: Ericsson, Qualcomm; Title: New WID on Even further enhanced MTC for LTE (RP-170732)—Mar. 6-9, 2017.
Additional Comments Related to Section 4.3 of 3GPP TSG RAN Meeting #75; Dubrovnik, Croatia; Source: Ericsson, Qualcomm; Title: New WID on Even further enhanced MTC for LTE (RP-170732)—Mar. 6-9, 2017.
3GPP TSG RAN Meeting #85; Dubrovnik, Croatia; Source: Huawei, HiSilicon, Neul; Title: New WID on Further NB-IoT enhancements (RP-170852)—Mar. 6-9, 2017.
PCT International Search Report for International application No. PCT/SE2018/050307—dated Jul. 2, 2018.
PCT Written Opinion of the International Searching Authority for International application No. PCT/SE2018/050307—dated Jul. 2, 2018.
Chinese Office Action issued for Application No. 201880020882.4—dated Sep. 2, 2021.
Chinese Search Report issued for Application No. 2018800208824—dated Sep. 2, 2021.
3GPP TSG RAN WG1 Meeting #88; Athens, Greece; Source: CATT; Title: Wakeup signal for on-demand access for UE power saving in NR system design (R1-1702096)—Feb. 13-17, 2017.
Notice of Allowance issued for Chinese Application No. 201880020882.4—dated Nov. 2, 2022.
3GPP TSG RAN WG1 Meeting #84bis; Busan, Korea; Source: Qualcomm Incorporated; Title: NB-PDCCH design (R1-163010)—Apr. 11-15, 2016.
3GPP TSG RAN WG1 Meeting #87; Reno, USA; Source: Huawei, HiSilicon; Title: Performance evaluation of channel coding schemes for control channel (R1-1611257)—Nov. 14-18, 2016.

* cited by examiner

Go-to-sleep signal design

SIGNALING INDICATION TO REDUCE POWER CONSUMPTION FOR MTC DEVICES

PRIORITY

This nonprovisional application is a U.S. National Stage Filing under 35 § 371 of International Patent Application Serial No. PCT/SE2018/050307 filed Mar. 23, 2018 and entitled "Signaling Indication to Reduce Power Consumption for MTC Devices" which claims priority to U.S. Provisional Patent Application No. 62/476,197 filed Mar. 24, 2017 both of which are hereby incorporated by reference in their entirety.

TECHNICAL FIELD

The present disclosure relates, in general, to wireless communications, and more particularly to power consumption for MTC devices by a signaling indication.

BACKGROUND

3GPP are specifying and developing technologies to cover Machine-to-Machine (M2M) and/or Internet of Things (IoT) related use cases. For 3GPP Release 13 it includes enhancements to support Machine-Type Communications (MTC) with a new UE category M1 (Cat-M1), supporting reduced maximum bandwidth of up to 6 physical resource blocks (PRBs), and Narrowband IoT (NB-IoT) work item specifying a new radio interface (and UE category NB1, Cat-NB1).

We will refer to the LTE enhancements introduced in 3GPP Release 13 for MTC as "eMTC", and the further enhancements introduced in 3GPP Release 14 as "FeMTC" including but not limited to support for bandwidth limited UEs, Cat-M1, Cat-M2, and support for coverage enhancements. This is to separate discussion from NB-IoT, although the supported features are similar on a general level.

There are multiple differences between "legacy" LTE, e.g. a Release 8 user equipment and the procedures and channels defined for eMTC or FeMTC work (likewise for NB-IoT). Some important differences include a new physical downlink control channel, called MPDCCH used in eMTC and NPDCCH used in NB-IoT.

At the 3GPP RAN#70 meeting, a Release 13 work item named Narrowband IoT (NB-IoT) was approved. The objective is to specify a radio access for cellular internet of things (IoT) that addresses improved indoor coverage, support for massive number of low throughput devices, delay tolerant applications, ultra-low device cost, low device power consumption and (optimized) network architecture.

For NB-IoT, three different operation modes are defined, i.e., stand-alone, guard-band, and in-band. In stand-alone mode, the NB-IoT system is operated in dedicated frequency bands. For in-band operation, the NB-IoT system can be placed inside the frequency bands used by the current LTE system, while in the guard-band mode, the NB-IoT system can be operated in the guard band used by the current (legacy) LTE system. NB-IoT can operate with a system bandwidth of 180 kHz. When multiple carriers are configured, several 180 kHz carriers can be used, e.g., for increasing the system capacity, inter-cell interference coordination, load balancing, etc.

In order to adapt to certain use cases that require more capacity than usual, e.g., software or firmware upgrade, multi-carrier operations are used. The NB-IoT device listens to the system information on the anchor carrier, but when there is data, the communication can be moved to a secondary carrier.

In 3GPP RAN#75 meeting, a further N B-IoT enhancement Release 15 work item was agreed, see RP-170852, as working agreement to further enhance the performance of NB-IoT in terms of further latency and power consumption reduction, improvement of measurement accuracy, enhancement of NPRACH reliability and range enhancement, etc. In addition, further latency and power consumption reduction is one of the objectives as follows.

Further latency and power consumption reduction:
Power consumption reduction for physical channels
  Study and, if found beneficial, specify for idle mode paging and/or connected mode DRX, physical signal/channel that can be efficiently decoded or detected prior to decoding NPDCCH/NPDSCH. [RAN1, RAN2, RAN4]
  Study and, if found beneficial, support UL/DL semi-persistent scheduling. [RAN2, RAN1, RAN4]
Evaluate power consumption/latency gain and specify necessary support for DL/UL data transmission on a dedicated resource during the Random Access procedure after NPRACH transmission and before the RRC connection setup is completed. [RAN2, RAN1, RAN3]
Consider further enhancement of quick release of RRC connection after the last data transmission[RAN2]
Relaxed monitoring for cell reselection [RAN2, RAN4]
  Enable relaxed UE monitoring for cell (re)selection e.g. by (re)configuration
Support for physical layer SR [RAN1, RAN2]
Support for RLC UM in addition to Rel-14 SC-PTM support [RAN2]

Similar objectives are also given in the Even further enhanced MTC for LTE work item as follows in RP-170732.
Improved power consumption:
Power consumption reduction for physical channels
  Study and, if found beneficial for idle mode paging and/or connected mode DRX, specify physical signal/channel that can be efficiently decoded or detected prior to decoding the physical downlink control/data channel.
  Study and, if found beneficial for connected mode, specify physical signal/channel/DCI for HARQ-ACK feedback in DL for data transmission in UL.
Relaxed monitoring for cell reselection
  Enable relaxed UE monitoring for cell (re)selection e.g. by (re)configuration.
Support efficient transition between CE mode and non-CE for non-BL UE
  Enable CE mode operation (i.e., narrowband/wideband) for power saving purposes.
  This work is started after RAN#76 if the work is not completed already in Rel-14.

SUMMERY

To address the foregoing problems with existing solutions, such as,
for Rel-15 FeNB-IoT: "Study and, if found beneficial, specify for idle mode paging and/or connected mode DRX, physical signal/channel that can be efficiently decoded or detected prior to decoding NPDCCH/NPDSCH," and
for Rel-15 efeMTC: "Study and, if found beneficial for idle mode paging and/or connected mode DRX, specify physical signal/channel that can be efficiently decoded or detected prior to decoding the physical downlink control/data channel."

methods and apparatuses are for reduced power consumption is disclosed.

In the following text, N B-IoT refer to the current narrow band IoT system, and eMTC to refer to the enhanced MTC for LTE.

In the current N B-IoT or eMTC design, a UE needs to monitor the control channel for both RRC_IDLE and RRC_CONNECTED mode. That is, in order for the UE to detect if there is a paging message in RRC_IDLE mode, or a dedicated transmission for it in RRC_CONNECTED, it may attempt to decode MPDCCH (eMTC) or NPDCCH (NB-IoT).

Due to the coverage enhancement supported by NB-IoT and eMTC, in some cases a large number of repetitions are used. For the control channel monitoring, a UE monitors a search space configured by the network, and then performs blind detection to see whether a DCI is sent to it or not. The maximum number of repetitions, e.g. of the DCI message or associated sequence of bits, is configured by the network. Regardless whether there is a DCI sent to the UE, a UE needs to perform blind detection in the search space in which the UE is configured to monitor. Since the maximum number of repetitions can be very large in some cases, if there is no DCI sent to a UE, the UE would waste its power to monitor the entire search space.

To illustrate this problem, an NB-IoT system in RRC_IDLE mode (short as idle mode) is discussed as an example. However, similar principle applies in the RRC_CONNECTED mode (short as connect mode) when DRX is used. Further, eMTC has similar design, and although some of the numbers in the configurations and names of certain channels may differ from NB-IoT the principle is the same.

The idle mode operation for monitoring paging is illustrated in FIG. 1, showing UE idle mode operation for monitoring paging. In every paging cycle, the UE wakes up in designated time window to check whether there is a paging message. A paging cycle may be configured as DRX or eDRX cycle. The maximum DRX and eDRX cycles are 10.24 seconds and 2 hours, 54 minutes and 46 seconds, respectively (the corresponding values for eMTC are 2.56 seconds and 43 minutes and 41 seconds). A paging message is carried in NPDSCH and scheduled by DCI format N2 carried in NPDCCH. Multiplexing paging records for multiple UEs within one paging message is supported.

For UEs in extreme coverage limited situations, up to 2048 repetitions of NPDCCH may be used for transmitting a DCI. Thus, a UE may need to receive as many as 2048 subframes to determine whether there is a paging message sent on the associated NPDSCH (starting 4 NB-IoT subframes from the end of last NPDCCH subframe). In most cases however, there is no paging for the UE and hence no DCI format N2 sent at all during an eDRX cycle (The same applies for dedicated transmission in RRC connected). Thus, from power efficiency point of view, the UE may in many cases stay awake for unnecessarily long time attempting to decode DCI format N2. For machine type devices it is a target to achieve very long battery life, up to 10 years without re-charging. These resulting long time from attempt to decode NPDCCH will increase the UE power consumption and have a strong negative impact of battery life.

Currently, the UE can implement some early termination criteria to hypothesize whether there is message addressed to it in the search space where it monitors the control channel. But the UE may risk to miss the downlink control information, if the threshold is not properly tuned.

Another solution is provided in R1-167612 for eMTC operations to reduce the power consumption. The solution in R1-167612 is to design a "wake-up" signal to let the UE know whether to proceed to decode the coming MPDCCH. However, the solution given R1-167612 lacks certain scheduling flexibilities, especially if adopted in NB-IoT. Furthermore, as visualized in FIG. 2, as an example if the UE upon detecting the wake-up signal, the UE needs to listen NPDCCH/MPDCCH until a configured number of repetitions (Rmax) if the UE cannot decode the actual transmitted NPDCCH/MPDCCH. If no DCI is detected, the UE understand there is a missing DCI, or false alarm of the wake-up signal. On the other hand, if no signal detected, UE goes to sleep and/or stop monitoring the control channel. There is a risk of missing NPDCCH/MPDCCH, if the wake-up signal is not detected by the UE The embodiments described herein may enable a solution for a "go-to-sleep" and/or a "wake-up" signal to indicate whether a UE should continue monitor an upcoming control channel search space (NPDCCH search space for NB-IoT UEs, and MPDCCH search space for BL/CE UEs or BL UEs or non-BL UEs). The signaling is designed to both to make it practically feasible and/or to limit the negative impact from increased system overhead.

Some embodiments are about how to practically enable a short indication to UEs whether they should continue to monitor a control channel for Paging in RRC_IDLE or when using DRX in RRC_IDLE. Most often there is no control channel for the UE and this would therefore be very beneficial for UE battery life, especially in higher Coverage Enhancement levels. Coverage enhancement may correspond to a number of repetitions of information and/or related to a signal strength and/or signal quality pertaining to the UE.

According to some embodiments described herein a power consumption reduction at the UEs is provided. According to some embodiments described herein the scheduling flexibility at the network side is maintained. According to some embodiments described herein system overhead is limited and according to some embodiments control information detection reliability described is preserved and/or ensured.

To address the foregoing problems with existing solutions, disclosed is a method in a user equipment. The method comprises determining if a signal pertaining to control information is present in a first time period and deciding whether to attempt to decode the control information depending on the determination.

Also disclosed is a method in a network equipment. The method comprising transmitting a signal pertaining to if control information is present in a first time period and transmitting control information to a UE in accordance with the transmitted signal.

A time period may correspond to a subframe, or slot, or other time period having a predefined finite length.

Predetermine, as used in embodiments herein, may indicate that that both the eBN and the UE has the same understanding of the meaning of the signal prior to the transmission and/or reception of the signal.

Stop monitoring, as discussed herein, may include stop monitoring or not starting monitoring of the subsequent control channel search space. Stop monitoring, as discussed herein, may include stop monitoring or not starting monitoring of the subsequent control information. Stop monitoring, as discussed herein, may include refraining from attempting to decode the control information and/or control channel.

Control channel search space may be a NPDCCH (Narrowband Physical Downlink Control Channel) and/or MPDCCH (Machine type communication Physical Downlink Control Channel) search space. A control channel may be a NPDCCH and/or MPDCCH.

In embodiments herein a shared channel may be a NPDSCH (Narrowband Physical Downlink Shared Channel) or a PDSCH (Machine type communication Physical Downlink Shared Channel).

Control information may be information needed by a UE in order to communicate with the eNB. In one example the control information is downlink control information.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
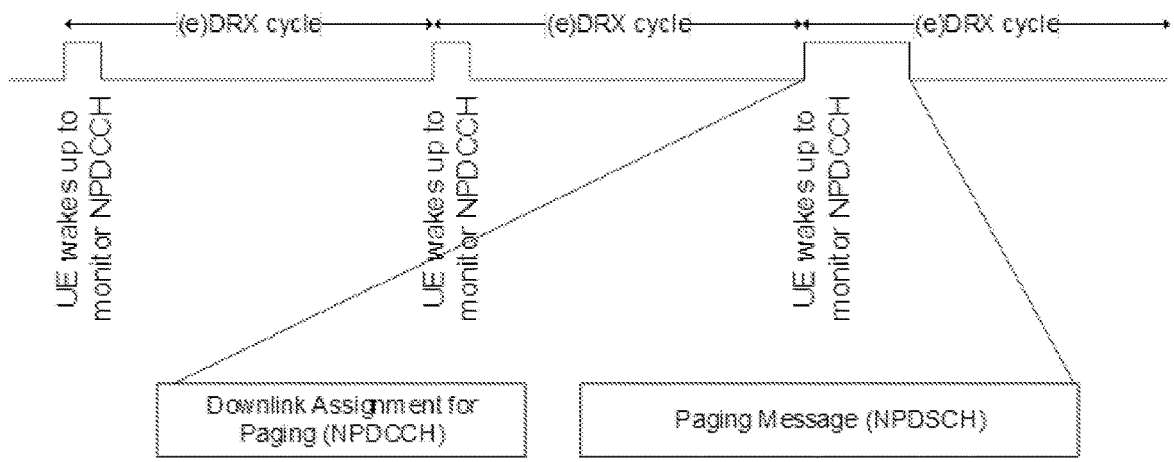
FIG. 1 Illustrates a user equipment in idle mode operation for monitoring paging FIG. 2 Illustrates a wake-up signal in relation of a control channel search space FIG. 3 Illustrates a wireless communications network
Figure 2:
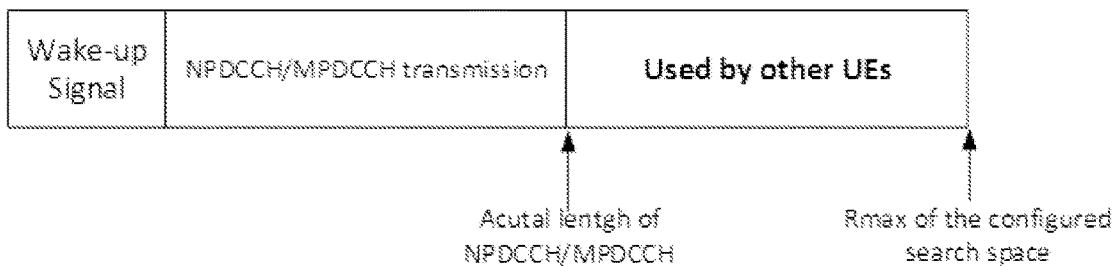
Figure 3:
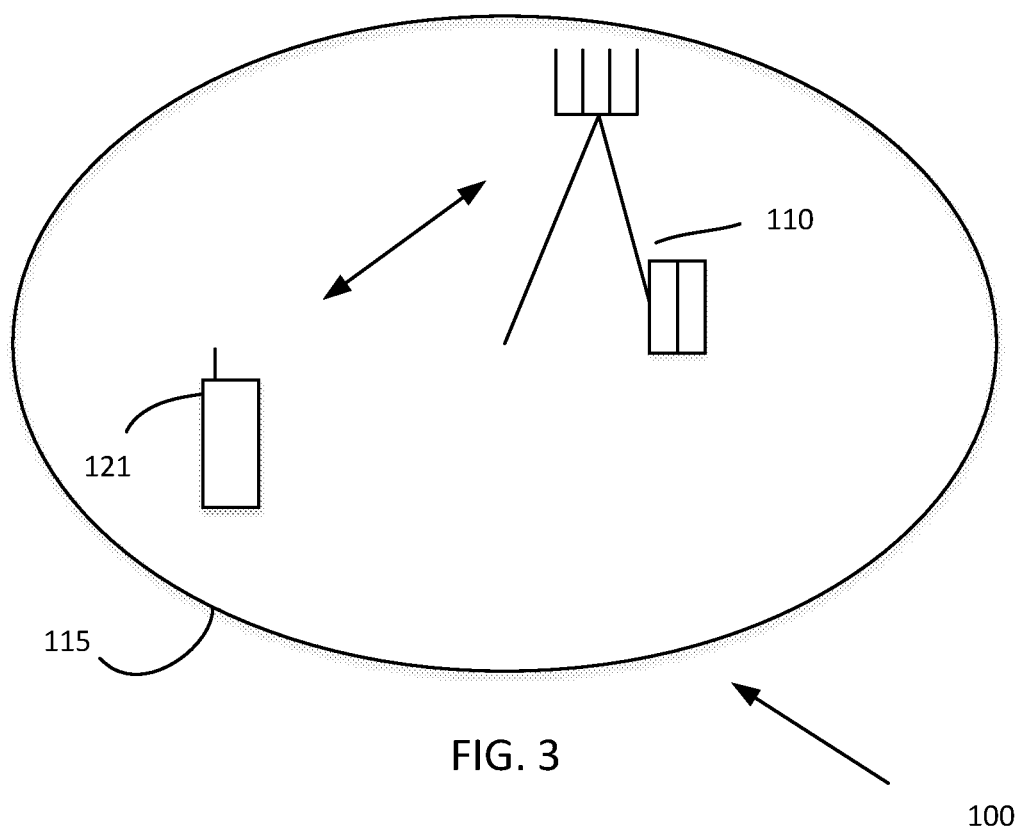

FIG. 3 depicts a wireless communications network 100 in which embodiments herein may operate. In some embodiments, the wireless communications network 100 may be a radio communications network such as a Long Term Evolution, LTE, network. Although, the wireless communications network 100 is exemplified herein as an LTE network, the wireless communications network 100 may also employ technology of any one of LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or GSM, or any other similar network or systems. The wireless communications network 100 may also employ technology for LTE based Narrowband IoT communicaton and/or LTE based MTC. The wireless communications network 100 may also be an Ultra Dense Network, UDN, which e.g. may transmit on millimetre-waves (mmW).

The wireless communications network 100 comprises a network equipment 110, 12. The network equipment 110, 12 serves at least one cell 115. The network equipment 110 may correspond to any type of network equipment or radio network equipment capable of communicating with a user equipment and/or with another network equipment, such as, e.g. be a base station, a radio base station, eNB, eNodeB, a Home Node B, a Home eNode B, femto Base Station (BS), pico BS, etc., in the wireless communications network 100. Further examples of the network equipment 110, 12 may also be e.g. repeater, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, a Remote Radio Unit (RRU), a Remote Radio Head (RRH), nodes in distributed antenna system (DAS), core network node (e.g. MSC, MME, etc.), O&M, OSS, SON, positioning node (e.g. E-SMLC), MDT, etc.

In FIG. 3, a user equipment 121, 14 is located within the cell 115. The user equipment 121 is configured to communicate within the wireless communications network 100 via the network equipment 110 over a radio link served by the network equipment 110, 12. The user equipment 121, 14 may refer to any type of wireless device communicating with a network equipment and/or with another user equipment in a cellular, mobile or radio communication network or system. Examples of such user equipments are mobile phones, cellular phones, Personal Digital Assistants (PDAs), smart phones, tablets, sensors equipped with a UE, Laptop Mounted Equipment (LME) (e.g. USB), Laptop Embedded Equipments (LEEs), Machine Type Communication (MTC) devices, or Machine to Machine (M2M) device, Customer Premises Equipment (CPE), target device, NB-IoT UEs or devices, device-to-device (D2D) user equipment, user equipment capable of machine to machine (M2M) communication, etc.

Furthermore, although embodiments below are described with reference to FIG. 3, this should not be construed as limiting to the embodiments herein, but merely as an example made for illustrative purposes. It should also be noted that the wireless communications network 100, the network equipment 110, 12 and the user equipment 121, 14 may support radio access technologies, such as, e.g. NB IoT, EC-GSM-IoT, LTE MTC, that utilizes repetition based link adaptation for which the embodiments described herein may be particularly advantageous. However, the embodiments described herein may also be applicable and advantageous in any wireless communications network configured to operate using small cells or cells with uplink transmit power constraints.

One possible solution for UE power consumption reduction is to indicate before the first subframe of a control channel search space (e.g NPDCCH/MPDCCH search space), or in the first subframe of the control channel search space, whether there will be any DCI sent during the coming control channel search space.

Figure 4:
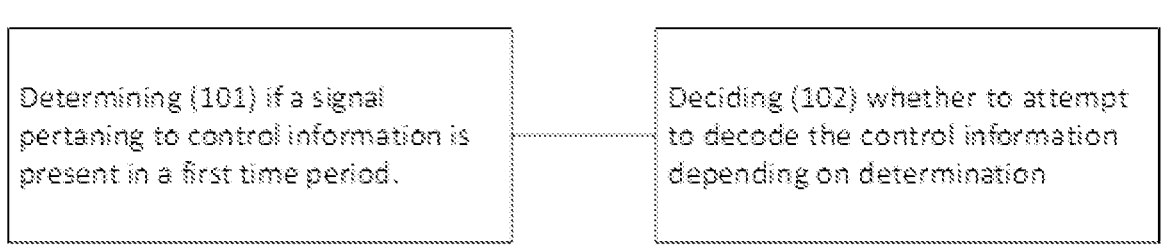
FIG. 4 is a flow diagram of a method in a user equipment, in accordance with certain embodiments

FIG. 4 is a block diagram illustrating an embodiment of a method for a user equipment, UE, comprising determining (101) if a signal pertaining to control information is present in a first time period and deciding (102) whether to attempt to decode the control information depending on determination.

The signal pertaining to control information may indicate that there is no control information present in the time period or the signal pertaining to control information may indicate that there is no control information present in a second time period following the first time period. The signal pertaining to control information may indicate that there is no control information and that the UE may stop monitoring for control information. The signal pertaining to control information may indicate that there is no control information and that the UE may stop monitoring for control information during the first time period and/or stop monitoring for control information during a second time period following the first time period In some embodiment, if the signal is present and or received by the UE, the UE stops monitoring the control channel.

Figure 5:
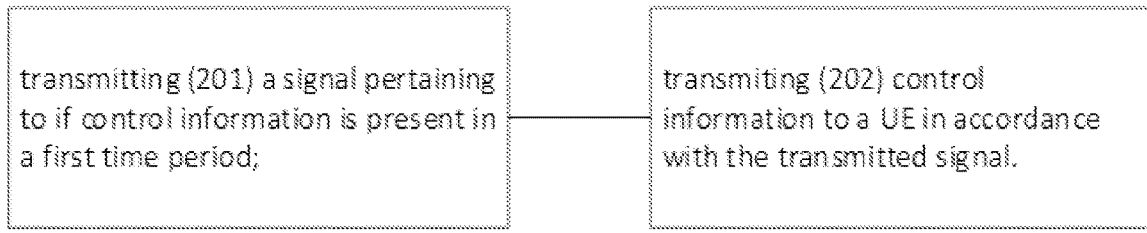
FIG. 5 is a flow diagram of a method in a network equipment, in accordance with certain embodiments FIG. 6 Illustrates a go-to-sleep in relation of a control channel search space FIG. 7 Illustrates a lack of a go-to-sleep in relation of a control channel search space FIG. 8 Illustrates a user equipment in idle mode operation for monitoring paging FIG. 9 Illustrates a wake-up signal with a length indicator in relation of a control channel search space FIG. 10 Illustrates a resource use of a wake-up signal in relation of a control channel search space FIG. 11 Illustrates a resource use of a wake-up signal in relation of a control channel search space

FIG. 5 is a block diagram illustrating an embodiment of a method for a network equipment, NE (e,g. eNB), comprising transmitting a signal pertaining to if control information is present in a first time period and transmitting control information to a UE in accordance with the transmitted signal.

There are a number of alternatives on how to transmit a signal pertaining to control information and/or what the signal represents, as discussed below.

The signal as in the signal pertaining to control information may refer to the . . . "go-to-sleep" signal and/or the "wake-up" signal. The signal may also pertain to a control channel instead or in addition to control information.

A "go-to-sleep" signal may be used. This signal is used to indicate that there will not be any control information, such as down-link control information (DCI), sent during the control channel search space, such as a NPDCCH/MPDCCH search space, that follows. Upon receiving such a signal, the UE goes back to the sleep mode. However, if the signal, e.g. "go-to-sleep" signal, is not detected, the UE has to stay up to attempt to decode the control information, e.g. DCI, carried in a control channel. Alternatively, if the signal, e.g. "go-to-sleep" signal, is not detected, the UE attempts to decode the control information, e.g. DCI, carried on a control channel such as, e.g. NPDCCH/MPDCCH.

With the "go-to-sleep" signal approach, it is up to the network equipment, e.g. eNB, to determine whether it desires to provide such a signal to improve UE power efficiency, since the absence of such a signal (or indicator) does not result in UE missing a DCI. The eNB may decide whether to transmit the signal or not. Therefore, this is a very dynamic solution, and being able to skip such an indicator signal at any time, from eNB scheduler flexibility perspective, may be advantageous. For example, if the subframe(s) before the start of the control channel search space is already used for sending control channels or shared channels to another UE, the eNB may want to skip such a signal (or indicator).

This signal, e.g. "go-to-sleep" signal, may used to indicate that there will be no paging record sent during the (e)DRX cycle that follows. Upon receiving such a signal, the UE goes back to the sleep mode. However, if the "go-to-sleep" signal is not detected, the UE has to stay up to attempt to decode the DCI format N2 carried in NPDCCH.

The eNB may decide whether to transmit the signal or not based on if there are available resources for transmitting the signal or not. On the other hand, if the subframe(s) before the start of the control channel search space is available, or the first subframe(s) NPDCCH/MPDCCH search space are available, the eNB can signal such a signal (or indicator), when there will be no paging message in the (e)DRX cycle or when there is no DCI being transmitted in the coming control channel search space, to help the UE conserve energy.

The eNB may transmit the signal when there is no paging message and/or control information such as DCI. Furthermore, the "go-to-sleep" signal approach is robust in the sense that if the UE fails to detect such a signal (or indicator), there is no risk of missing a paging message and/or control information such as DCI. Note also that that a go-to-sleep signal would only need to be sent in configured Paging Frames or when there is a UE in RRC_CONNECTED mode configured with DRX, and in the corresponding subframes. The eNB may transmit the signal if a paging message is to be transmitted and/or if a UE is configured with DRX.

The "go-to-sleep" signal does not necessary need to occupy one or several entire subframe (s). The eNB may transmit the signal in one or more subframe. The signal can use part of the subframes, either in time or frequency domain, e.g., the first several symbols in a slot, or a combination of time or frequency domain. The eNB may transmit the signal in a part of a subframe, e.g. in one or more symbols. The UE may receive the signal in a part of a subframe, e.g. in one or more symbols.

With the "go-to-sleep" signal approach, it may be up to the eNB to determine whether it desires to provide such a signal to improve UE power efficiency, since the absence of such an indicator does not result in UE missing a paging message. Being able to skip such an indicator, from eNB scheduler flexibility perspective, may be advantageous. For example, if the subframe(s) before the start of the NPDCCH search space is already used for sending NPDCCH or NPDSCH to another UE, the eNB may want to skip such an indicator. On the other hand, if the subframe(s) before the start of the NPDCCH search space is available, eNB can signal such an indicator, when there will be no paging message in the (e)DRX cycle, to help the UE conserve energy. Furthermore, the "go-to-sleep" signal approach is more robust in the sense that if the UE fails to detect such an indicator, there is no risk of missing a paging message. One drawback though is that a maximum UE power saving can be achieved only when such an indicator is always sent whenever there is no paging message in the (e)DRX cycle, and this would increase system overhead (depending on the number of configured Paging Frames).

In eMTC and in inband deployment of NB-IoT, there is a region in the beginning of each downlink subframe containing one or a few symbols that are unused by eMTC and NB-IoT, respectively. It may be possible to map the "go-to-sleep" signal to this region. The eNB may transmit the signal in the first symbol of a subframe. The eNB may transmit the signal in the first and/or second symbol of a subframe. The eNB may transmit the signal in the first and/or second and or third symbol of a subframe. The UE may receive the signal in the first symbol of a subframe. The UE may receive the signal in the first and/or second symbol of a subframe. The UE may receive the signal in the first and/or second and or third symbol of a subframe. Since the region is available in every downlink subframe, it is possible to send the signal in any subframe, even within the control channel search space. The eNB may transmit the signal in every downlink subframe which do not comprise as paging message or when a UE is configured with DRX. This means that it is possible to use the search space for control channel transmissions in the beginning of the search space and then send the "go-to-sleep" signal when there are no more control channel transmissions to be transmitted.

The length and/or formats of the "go-to-sleep" signal can either be the same for all UEs in a cell, or independently configured for each UE. The length and/or formats may also depend on the coverage conditions of a UE. Some non-exclusive examples are given as follows.

The "go-to-sleep" signal can be but is not limited to one or several of the following choices:

1. A predetermined bits sequence that is modulated to symbols. After decoding, at the UE, the received symbols, if the bit sequence indicates the UE should "go-to-sleep" then the UE stops monitoring the subsequent control channel search space. The advantage of using a predetermined bit sequence is that it allows for an easy implementation where all UEs irrespectively of status and/or coverage condition may search for or find the same signal pertaining to control information.

2. A predetermined bits sequence that is modulated to symbols and repeated based on the configured maximum length of the control channel search space, such as the NPDCCH/MPDCCH search space. Alternatively, or in addition, the signal comprises a bit sequence repeated based on a maximum length of a control channel search space of a control channel carrying the control information. The advantage is that UEs using a longer search space due to worse channel conditions may except a longer signal indicating that the UE should go to sleep. This improves the likelihood that the UE will detect the signal. The number of repetitions may therefore be implicitly based on the coverage conditions of the UE when there is a correlation between the search space length and the coverage and/or coverage level of the UE. After decoding the received symbols, if the bit sequence indicates the UE should "go-to-sleep" then the UE stops monitoring the subsequent control channel search space.

3. A predetermined coded bits sequence, where the code rate and/or number of repetitions depends on the configured maximum length of the control channel search space. Alternatively, or in addition, the signal comprises a coded bit sequence, where a code rate of the coded bit sequence depends on a maximum length of a control channel search space of a control channel carrying the control information. The advantage is that UEs using a longer search space due to worse channel conditions may except for example a more robust coding than a UE with a shorter search space. This improves the likelihood that the UE will detect the signal due to the selected coding rate. After decoding the received symbols, if the bit sequence indicates the UE should "go-to-sleep" then the UE stops monitoring the subsequent control channel search space.

4. A predetermined sequence of symbols, where the length of the sequence depends on the configured maximum length of the control channel search space. Alternatively, or in addition, the signal comprises a sequence of symbols, where a length of the sequence depends on a maximum length of a control channel search space of a control channel carrying the control information. The advantage is that UEs using a longer search space due to worse channel conditions may except a longer signal indicating that the UE should go to sleep similar to bullet number three above. The difference lies in that the symbols are repeated instead of bit sequence having been modulated in to symbols. After detecting symbol sequence, the UE stops monitoring the subsequent control channel search space.

5. A predetermined long sequence of symbols, where the final sequence consists of several short sequences of symbols. The number of the short sequences of symbols depends on the configured maximum length of the control channel search space. The advantage is that the UE may abort detecting and/or receiving the signal after the UE has determined the meaning and/or information of the signal, thus conserving energy. After detecting the long symbol sequence or several of the short symbol sequences, the UE stops monitoring the subsequent control channel search space.

6. A go-to-sleep signal may be associated with a control channel repetition level, such as control channel repetition level. The signal pertaining to control information may be enabled based on a repetition level of the UE. This allows the network to inform devices that a certain control channel repetition level will not be used in the control channel search space, such as the NPDCCH/MPDCCH search space, which will allow the devices to go early to sleep. The eNB may configure, e.g. by transmitting an indication of a configuration, to the UE that only a subset of available repetition levels may be used by the UE in the control channel search space.

7. For the signaling part and enabling/disabling of the "go-to-sleep" signal eNB may at any point, without informing the UEs, include, in a transmission, the signal or not. When used for paging, the network in principle has no knowledge of which UEs are in the cell and the signal would have to be included and/or transmitted "blindly" in the configured paging frames/subframes. Machine type devices are however often stationary and judging from earlier data sessions, Tracking Area Updates, etc. the network can estimate which UEs are in the network. This could be compared with the capability for these UEs to support this feature to guide the eNB decision of whether or not it is beneficial to transmit the "go-to-sleep" signals at a given time, i.e. taking in to account the balance between the negative network impact in the form of slightly increase system overhead and the positive effects on UE power consumption. In one embodiment, more relevant for DRX in RRC_CONNECTED mode, the eNB would transmit the "go-to-sleep" signal only when UEs supporting the feature according to the UE capability are monitoring control channel according to their DRX configurations. In another embodiment the UEs supporting this feature could have separate Paging Occasions/Paging Frames (paging partitioning) in order to minimize the added system overhead [*].

8. However, since it is an additional effort for the UE to decode the new "go-to-sleep" in another embodiment the eNB would indicate whether the feature is activated in System Information broadcast (simple on/off indication or differentiation as described below). This configuration would be cell-specific, and either the same or separate indications could be used for paging in RRC_IDLE and DRX in RRC_CONNECTED. In the latter case, the network enabling/disabling of the feature could also be indicated in dedicated signaling, for example the RRC signaling during RRC Connected Establishment. For NB-IoT the enabling/disabling of the feature could be signaled per carrier, e.g. different configurations for different non-anchor carriers (mostly relevant for DRX in RRC_CONNECTED). Since the gain is biggest for higher Coverage Enhancements levels, in yet another embodiment the enabling/disabling of the feature could be signaled per Coverage Enhancement level. That is, it could be configured such that different settings can be configured depending on NPDCCH/MPCCH repetition number. In one example the eNB could signal that the "go-to-sleep" signal will be transmitted for a repetition level above a certain threshold R which is signaled in SI or RRC. In one embodiment for the "go-to-sleep" signal (excluding "wake-up" signal), an indication from eNB that the feature is enabled should be interpreted as that UEs should attempt to decode this signal for their own benefit, but not necessarily that eNB is required to transmit it at every possible occurrence (this is to keep the scheduling flexibility as described above).

The configured maximum length of the control channel search space may be a number of downlink subframes. The configured maximum length of the control channel search space may be a number of consecutive downlink subframes. The configured maximum length of the control channel search space may be a number of consecutive NB-IoT downlink subframes excluding subframes used for transmission and/or reception of system information.

Figure 6:
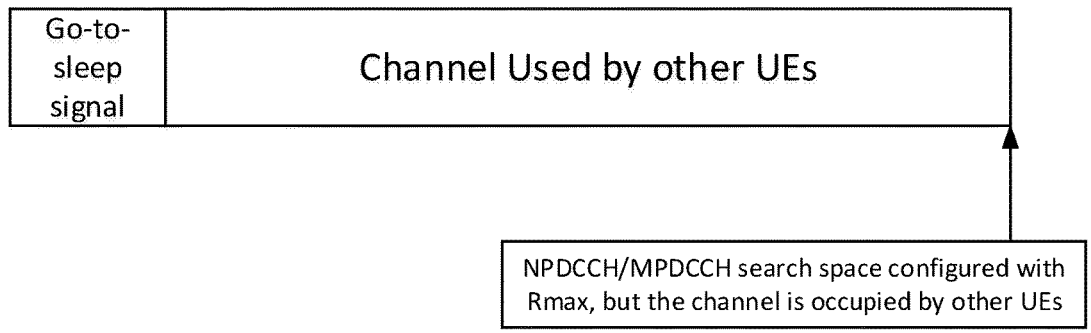
Figure 7:
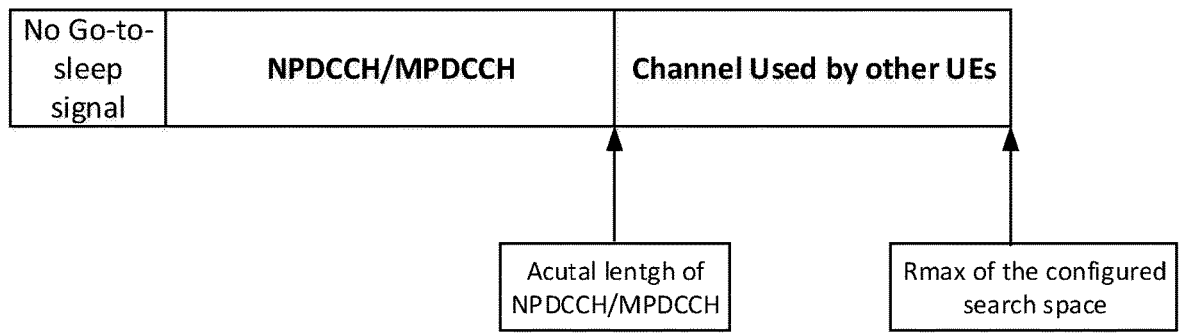

As shown in FIG. 6 and FIG. 7, advantages of using signals such as the go-to-sleep signal is that can be sent on a best effort basis. Upon detecting the go-to sleep signal, the UE may stop monitoring, as the UE knows the subsequence configured search space is not intended for the UEs. If no signal detected, the UE may continue monitor the control channel until a maximum number of repetitions, Rmax. In this case there is no risk of missing the control information on the control channel. The go-to-sleep signal is not sent if there is a control channel that should be monitored by a UE. In this case maximum scheduling flexibility is maintained, as well as power saving at the UE can be achieved.

A "wake-up" signal may be used. This signal is used to indicate that there will be control information, e.g. one or more DCIs, sent in the coming control channel search space such as a NPDCCH/MPDCCH search space. Upon receiving such a signal, the UE may attempt to decode the control information carried in/on a control channel. However, if the "wake-up" signal is not present, the UE can go back to sleep and/or stop monitoring. The "wake-up" signal can be sent in subframe(s) before the start of control channel search space, such as NPDCCH/MPDCCH search space or at the beginning of the control channel search space. Also, the "wake-up" signal does not necessarily occupy one or several entire subframe (s). The signal can use partial of the subframes, either in time or frequency domain, e.g., first several symbols in a slot, or a combination of time and frequency domain.

This signal may be used to indicate that there will be one or more paging records sent during the (e)DRX cycle that follows. Upon receiving such a signal, the UE needs to stay up to attempt to decode the DCI format N2 carried in NPDCCH. However, if the "wake-up" signal is not present, the UE can go back to sleep.

With the "wake-up" signal approach, the overhead required for maximizing the UE power saving is smaller as this signal only should be sent when there will be a DCI during the subsequent control channel search space. However, if indeed there will be a DCI during the subsequent control channel search space, the wake-up signal needs to be sent, otherwise the UE will miss the paging message. However, it is likely that the subframe(s) before the start of control channel search space may be already used for sending control channel or NPDSCH/PDSCH to another UE or SI messages. Thus, this solution may have an impact on scheduling flexibility or the "wake-up" signal cannot always be transmitted, resulting in missed DCI.

One possible solution is to indicate whether "wake-up" signal will be used or not using System Information (SI). This allows the network to toggle between on and off of such a feature. When the feature is turned off, the UE can skip checking the "wake-up" signal, but needs to always attempt to monitor the control channel search space.

In one or more of the embodiments herein:
  The eNB may indicate whether "wake-up" signal will be used or not using System Information (SI) being transmitted to a UE.
  The UE may receive an indication whether "wake-up" signal will be used or not using System Information (SI).
  The eNB my use a dynamic or semi-dynamic indication of the presence of the "wake-up" signal.
  The eNB my enable the "wake-up" signaling based on the coverage conditions of the UEs. The enabling may be performed by signaling as discussed above.
  To enable the "wake-up" signaling based on the configured length of the control channel search space.
  To have mandate occasions that "wake-up" signal cannot be configured. This ensures a minimum reachability to a UE.

The length and/or formats of the "wake-up" can either be the same for all UEs in a cell, or depending on the coverage conditions of a UE. Some non-exclusive examples are given as follows.

The "wake-up" signal can be but not limited to one or several of the following choices:
  1. A predetermined bits sequence that modulated to symbols. After decoding the received symbols, if the bit sequence indicates the UE should "wake-up" then the UE begins to monitor the subsequent control channel search space. The advantage of using a predetermined bit sequence is that it allows for an easy implementation where all UEs irrespectively of status and/or coverage condition may search for or find the same signal pertaining to control information.
  2. A predetermined bits sequence that modulated to symbols, and repeated based on the configured maximum length of the control channel search space. Alternatively, or in addition, the signal comprises a bit sequence repeated based on a maximum length of a control channel search space of a control channel carrying the control information. The advantage is that UEs using a longer search space due to worse channel conditions may except a longer signal indicating that the UE should go to sleep. This improves the likelihood that the UE will detect the signal. The number of repetitions may therefore be implicitly based on the coverage conditions of the UE when there is a correlation between the search space length and the coverage and/or coverage level of the UE. After decoding the received symbols, if the bit sequence indicates the UE should "wake-up" then the UE begins to monitor the subsequent control channel search space.
  3. A predetermined coded bits sequence, where the code rate and/or number of repetitions depends on the configured maximum length of the control channel search space. Alternatively, or in addition, the signal comprises a coded bit sequence, where a code rate of the coded bit sequence depends on a maximum length of a control channel search space of a control channel carrying the control information. The advantage is that UEs using a longer search space due to worse channel conditions may except for example a more robust coding than a UE with a shorter search space. This improves the likelihood that the UE will detect the signal due to the selected coding rate. After decoding the received symbols, if the bit sequence indicates the UE should "wake-up" then the UE begins to monitor the subsequent control channel search space.

4. A predetermined sequence of symbols, where the length of the sequence depends on the configured maximum length of the control channel search space. Alternatively, or in addition, the signal comprises a sequence of symbols, where a length of the sequence depends on a maximum length of a control channel search space of a control channel carrying the control information. The advantage is that UEs using a longer search space due to worse channel conditions may except a longer signal indicating that the UE should go to sleep similar to bullet number three above. The difference lies in that the symbols are repeated instead of bit sequence having been modulated in to symbols. After detecting symbol sequence, the UE should "wake-up" then the UE begins to monitor the subsequent control channel search space.

5. A predetermined long sequence of symbols, where the final sequence consists of several short sequences of symbols. The number of the short sequences of symbols depends on the configured maximum length of the control channel search space. The advantage is that the UE may abort detecting and/or receiving the signal after the UE has determined the meaning and/or information of the signal, thus conserving energy. After detecting the long symbol sequence or several of the short symbol sequences, the UE should "wake-up" then the UE begins to monitor the subsequent control channel search space.

6. A wake-up-sleep signal may be associated with a certain control channel repetition level. The signal pertaining to control information may be enabled based on a repetition level of the UE. This allows the network to inform devices that a certain control channel repetition level will be used in the search space, which will allow the devices to limit its monitoring to that repetition level.

For the signaling part and enabling/disabling of the "wake-up" signal, the same text as for the "go-to-sleep" signal apply. There is however one main difference, the UEs may need know whether the feature is enabled or not and the eNB must ensure "wake-up" signals are always transmitted when enabled, otherwise it will lead to a missed control channel. Therefore, some enabled/disabled notification may always apply for the "wake-up" signal (whereas it is optional for the "go-to-sleep" signal). There are varying levels of how dynamic this could be, it could e.g. be fixed in the standard and not dynamic at all or signaled in System Information or RRC (as for the "go-to-sleep" signal above). However, to limit the drawbacks from scheduling flexibility restrictions it would be desired to make it as dynamic as possible and therefore embodiments in which it is enabled in a) a flag in the MasterinformationBlock (MIB), b) an indication in SIB1 or any other SIB, c) a direct indication in DCI d) RRC configuration and re-configuration.

For the DRX in CONNECTED_MODE part, the eNB would know the UE capability for this feature as any other UE capability (i.e. initially communicated from the UE at attached and then part of the UE context). However, for the paging part the eNB would have no knowledge of whether the UE supports this feature. In this case it would be required that this UE capability is stored in a network node, e.g. most likely the MME, and that an indication that the UE is capable of this feature is included in the paging request sent from MMW to eNB. In this case eNB would know that it has to include the "wake-up" signal or not. This would not be as relevant for the "go-to-sleep" signal since this may be transmitted also when there is no paging for the UE, however for the case when paging resources are partitioned depending on whether or not this feature is supported this new Information Element in the paging request would be required for the eNB to know in which paging resources it should page the UE (see [*] above. This is also applicable if paging partitioning is applied to the "wake-up" signal).

Figure 8:
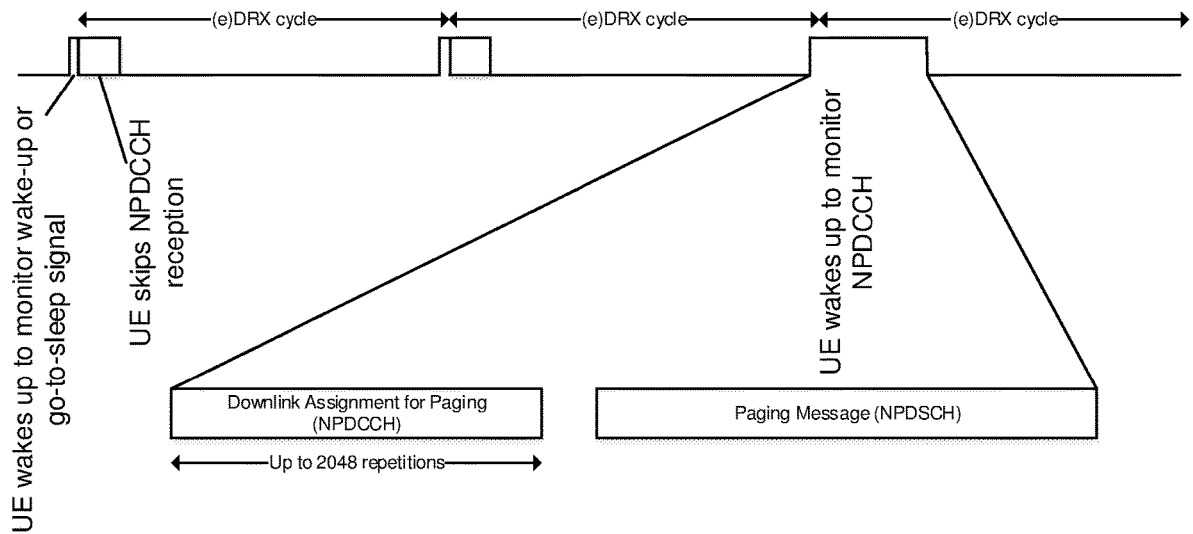

Both alternatives can be illustrated in FIG. 8, showing UE idle mode operation for monitoring paging. Both alternatives can help reduce UE power consumption, especially for UEs in extreme coverage limited situations. Here NB-IoT is used as an example. eMTC has similar designs, though some of the numbers in the configurations and names of certain channels may differ from NB-IoT.

With the "wake-up" signal approach, the overhead required for maximizing the UE power saving is smaller as this signal only should be sent when there will be a paging message during the subsequent (e)DRX cycle. However, if indeed there will be a paging message during the subsequent (e)DRX cycle, the wake-up signal needs to be sent, otherwise the UE will miss the paging message. However, it is likely that the subframe(s) before the start of NPDCCH search space may be already used for sending NPDCCH or NPDSCH to another UE or SI messages. Thus, this solution will may have an impact on the scheduling flexibility or the "wake-up" signal cannot always be transmitted, resulted in missed paging.

Figure 9:
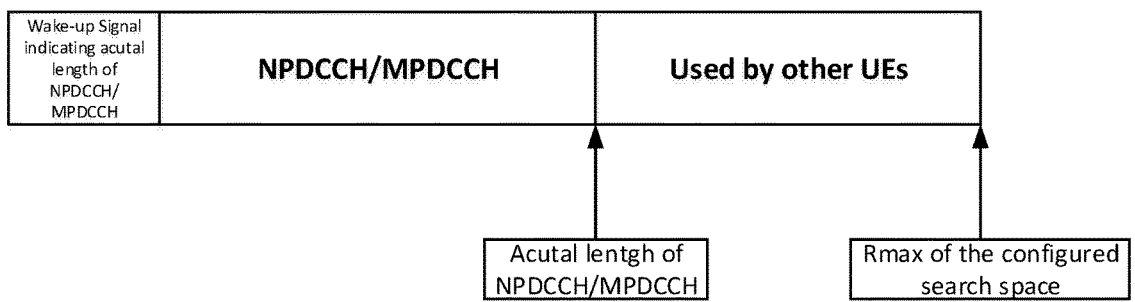

As an example, visualized in FIG. 9, there is room for improving how the UE may conserve energy.

The "wake-up" signal can indicate the actual length of the transmission of the control channel in the coming control channel search space. A UE does not need to continue to search its configured maximum length of the coming control channel search space, if the signal indicates the actual length of the transmission is shorter than the configured maximum length of the control channel search space.

Upon detecting the wake-up signal, the UE also receives information relating to a length of the control channel transmission. The signal may therefore indicate a length of a control channel transmission comprising the control information. If no control information is detected, the UE understand there is a missing DCI, or false alarm of the wake-up signal. If no signal detected, UE can stop monitoring. However, there might be a risk of missing NPDCCH/MPDCCH, if the wake-up signal is not detected by the UE although the UE may save energy by using information relating to the length of the control channel.

Figure 10:
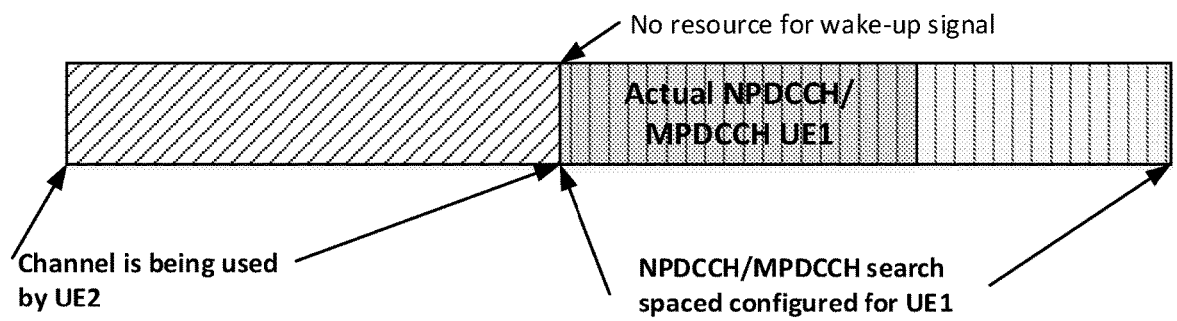

The use of a wakeup signal may be improved as partly visualized in FIG. 10. For example, in the paging case, the actual control channel transmission for a first UE always starts at the beginning of search space. As the channel is occupied by a second UE at the beginning of the search space, if the eNB decides to transmit a wake up signal, the transmission to the second UE needs to be segmented. Otherwise, the UE would miss the NPDCCH/MPDCCH resulting in missing paging.

Figure 11:
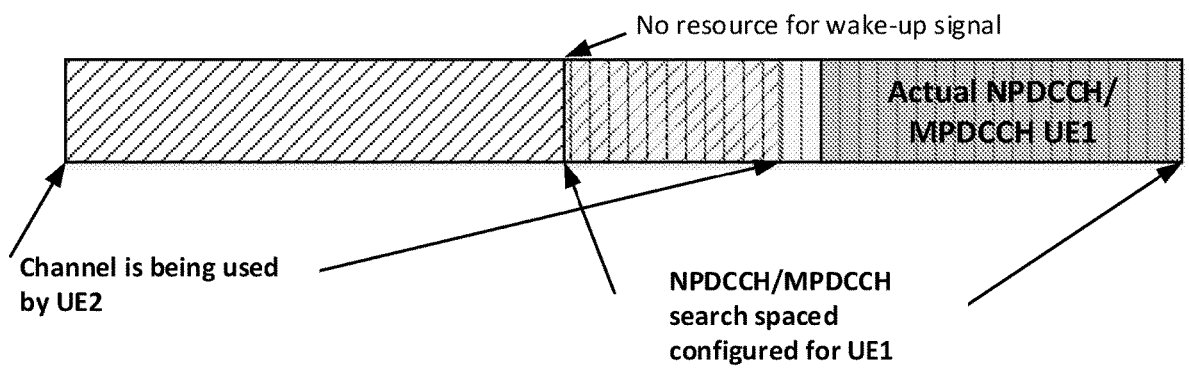

The use of a wakeup signal may be improved as partly visualized in FIG. 11. For the non-paging case, the actual control channel transmission for a first UE may start in the middle of its search space. The first UE may need blind detect several candidates in the search space, including the one at the beginning of the search space.

As the channel is occupied by a second UE at the beginning of the search space, if the eNB decides to transmit a wake up signal, the transmission of the second UE needs to be segmented. Otherwise, the UE would miss the control channel resulting in missing the control information.

The exact waveform for supporting either of such indicators, e.g. wake-up or go-to-sleep, may be similar to other downlink channels so that the additional development efforts on the UE side for receiving such indicators can be minimized. For example, existing NB-IoT downlink OFDM transmission may be used. The symbol or bit sequence patterns for mapping such indicators is discussed above.

Both "go-to-sleep" and "wake-up" signal may be used. Since "go-to-sleep" and "wake-up" signaling have their respective benefits, it may be beneficial to support both in a network. The switch between support of "go-to-sleep" and "wake-up" signaling can be either configured by higher layers (either broadcasted in system information (SI) signaling or configured using UE-specific radio resource control (RRC) signaling) or indicated using different codewords in a physical layer signal.

The appendix below provides a non-limiting example of how certain aspects of the proposed solutions could be implemented within the framework of a communication standard. In particular, the appendix provides a non-limiting example of how the proposed solutions could be implemented within the framework of a 3GPP TSG RAN standard. The changes described by the Appendix are merely intended to illustrate how certain aspects of the proposed solutions herein could be implemented in a technical standard. However, the proposed solutions could also be implemented in other suitable manners, both in the 3GPP Specification and in other specifications or standards.

Figure 12:
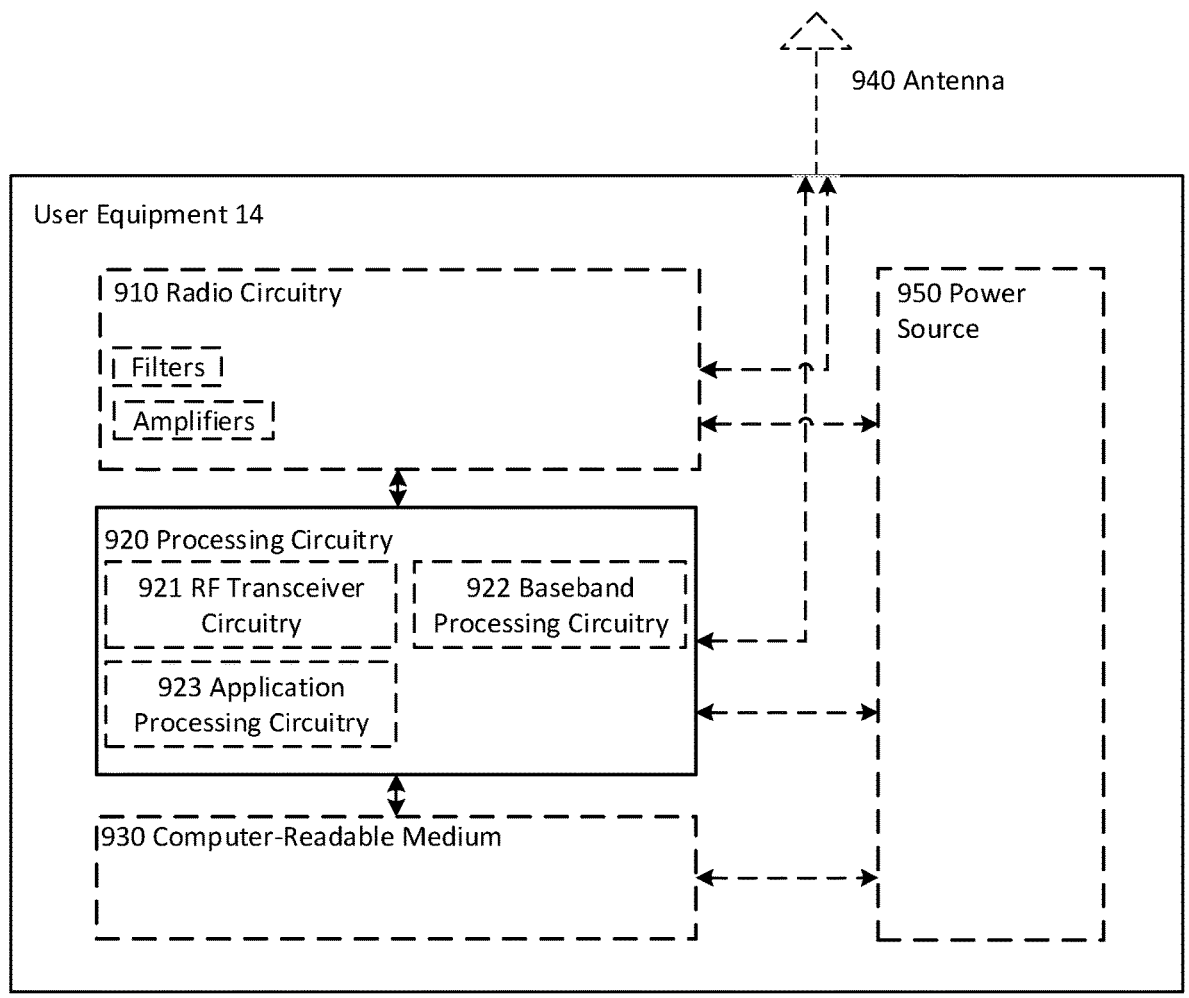
FIG. 12 is a block schematic of an exemplary user equipment, in accordance with certain embodiments
Figure 13:
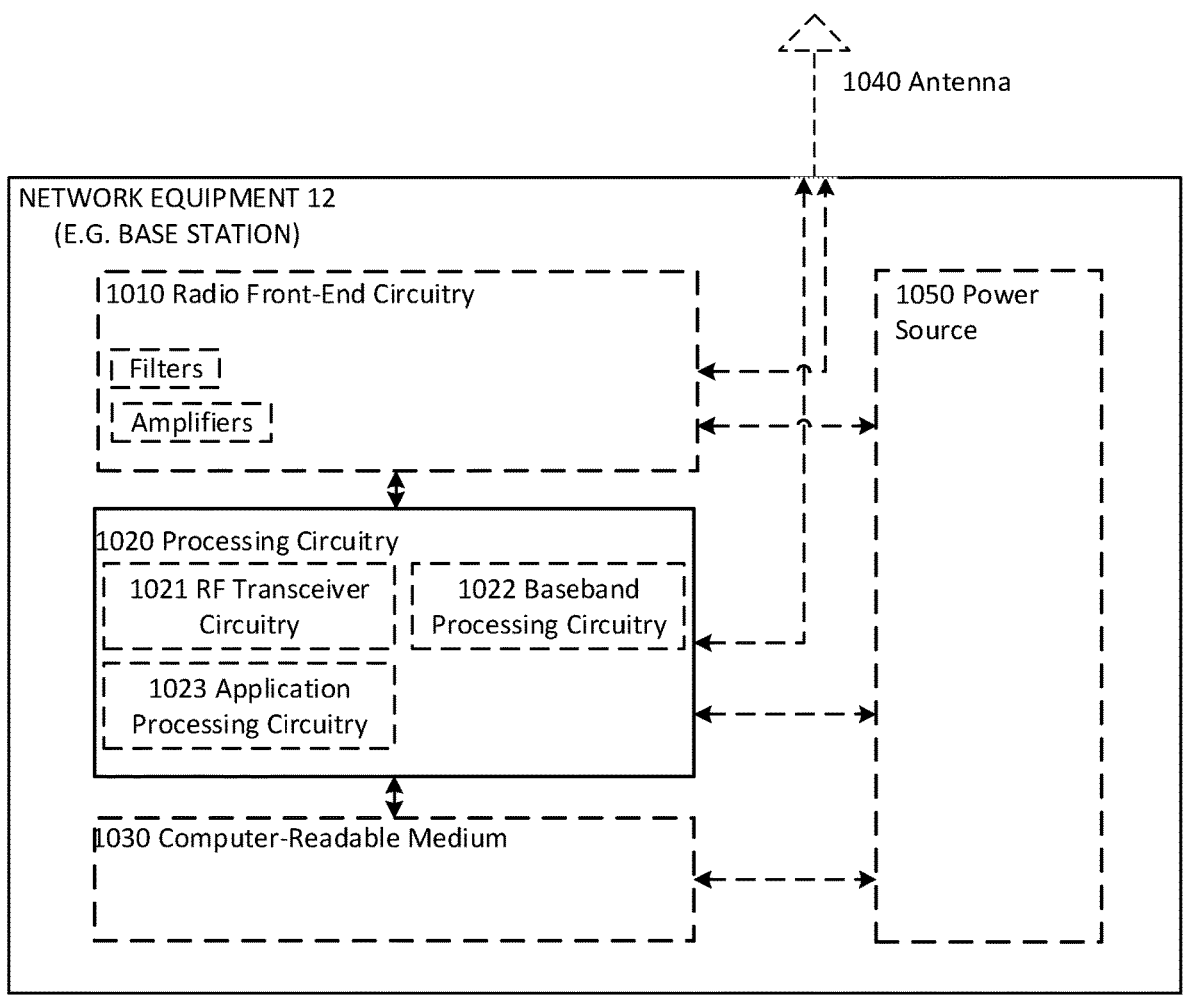
FIG. 13 is a block schematic of an exemplary network equipment, in accordance with certain embodiments

To perform the method as described herein a user equipment and a network equipment are provided. FIG. 12 and FIG. 13 are block diagrams depicting embodiments of the user equipment and a network equipment.

Additional details of the user equipment 14 are shown in relation to FIG. 12. As shown in FIG. 12, the example user equipment 14 includes an antenna 940, radio circuitry (e.g. radio front-end circuitry) 910, processing circuitry 920, and the user equipment 14 may also include a memory 930. The memory 930 may be separate from the processing circuitry 920 or an integral part of processing circuitry 920. Antenna 940 may include one or more antennas or antenna arrays, and is configured to send and/or receive wireless signals, and is connected to radio circuitry (e.g. radio front-end circuitry) 910. In certain alternative embodiments, user equipment 14 may not include antenna 940, and antenna 940 may instead be separate from user equipment 14 and be connectable to user equipment 14 through an interface or port. The processing circuitry 920 may be configured to determine if a signal pertaining to control information is present in a first time period. The processing circuitry 920 may be further configured to decide whether to attempt to decode the control information depending on determination.

The radio circuitry (e.g. radio front-end circuitry) 910 may comprise various filters and amplifiers, is connected to antenna 940 and processing circuitry 920, and is configured to condition signals communicated between antenna 940 and processing circuitry 920. In certain alternative embodiments, user equipment 14 may not include radio circuitry (e.g. radio front-end circuitry) 910, and processing circuitry 920 may instead be connected to antenna 940 without front-end circuitry 910. The radio circuitry 910 may be configured to receive a control channel and/or control information and/or signals pertaining to control information and/or control channels.

Processing circuitry 920 may include one or more of radio frequency (RF) transceiver circuitry, baseband processing circuitry, and application processing circuitry. In some embodiments, the RF transceiver circuitry 921, baseband processing circuitry 922, and application processing circuitry 923 may be on separate chipsets. In alternative embodiments, part or all of the baseband processing circuitry 922 and application processing circuitry 923 may be combined into one chipset, and the RF transceiver circuitry 921 may be on a separate chipset. In still alternative embodiments, part or all of the RF transceiver circuitry 921 and baseband processing circuitry 922 may be on the same chipset, and the application processing circuitry 923 may be on a separate chipset. In yet other alternative embodiments, part or all of the RF transceiver circuitry 921, baseband processing circuitry 922, and application processing circuitry 923 may be combined in the same chipset. Processing circuitry 920 may include, for example, one or more central processing units (CPUs), one or more microprocessors, one or more application specific integrated circuits (ASICs), and/or one or more field programmable gate arrays (FPGAs).

The user equipment 14 may include a power source 950. The power source 950 may be a battery or other power supply circuitry, as well as power management circuitry. The power supply circuitry may receive power from an external source. A battery, other power supply circuitry, and/or power management circuitry are connected to radio circuitry (e.g. radio front-end circuitry) 910, processing circuitry 920, and/or memory 930. The power source 950, battery, power supply circuitry, and/or power management circuitry are configured to supply user equipment 14, including processing circuitry 920, with power for performing the functionality described herein. A user equipment 14 comprises processing circuitry 920 and radio circuitry 910, wherein the UE is configured to determine if a signal pertaining to control information is present in a first time period and decide whether to attempt to decode the control information depending on the determination. The UE and/or any of the components and/or circuitry of the UE may be further configured to perform the methods as disclosed herein.

Additional details of the radio network node 12 are shown in relation to FIG. 13. As shown in FIG. 13, the example radio network node 12 includes an antenna 1040, radio circuitry (e.g. radio front-end circuitry) 1010, processing circuitry 1020, and the radio network node 12 may also include a memory 1030. The memory 1030 may be separate from the processing circuitry 1020 or an integral part of processing circuitry 1020. Antenna 1040 may include one or more antennas or antenna arrays, and is configured to send and/or receive wireless signals, and is connected to radio circuitry (e.g. radio front-end circuitry) 1010. In certain alternative embodiments, radio network node 12 may not include antenna 1040, and antenna 1040 may instead be separate from radio network node 12 and be connectable to radio network node 12 through an interface or port. The processing circuitry 920 may be configured to determine whether to transmit a control channel and/or control information and/or signals pertaining to control information and/or control channels.

The radio circuitry (e.g. radio front-end circuitry) 1010 may comprise various filters and amplifiers, is connected to antenna 1040 and processing circuitry 1020, and is configured to condition signals communicated between antenna 1040 and processing circuitry 1020. In certain alternative embodiments, radio network node 12 may not include radio circuitry (e.g. radio front-end circuitry) 1010, and processing circuitry 1020 may instead be connected to antenna 1040 without front-end circuitry 1010. The radio circuitry 1010 may be configured to transmit a signal pertaining to if control information is present in a first time period. The radio circuitry 1010 may be configured to transmit control information to a UE in accordance with the transmitted signal.

Processing circuitry 1020 may include one or more of radio frequency (RF) transceiver circuitry, baseband processing circuitry, and application processing circuitry. In some embodiments, the RF transceiver circuitry 1021, baseband processing circuitry 1022, and application processing circuitry 1023 may be on separate chipsets. In alternative embodiments, part or all of the baseband processing circuitry 1022 and application processing circuitry 1023 may be combined into one chipset, and the RF transceiver circuitry 1021 may be on a separate chipset. In still alternative embodiments, part or all of the RF transceiver circuitry 1021 and baseband processing circuitry 1022 may be on the same chipset, and the application processing circuitry 1023 may be on a separate chipset. In yet other alternative embodiments, part or all of the RF transceiver circuitry 1021, baseband processing circuitry 1022, and application processing circuitry 1023 may be combined in the same chipset. Processing circuitry 1020 may include, for example, one or more central processing units (CPUs), one or more microprocessors, one or more application specific integrated circuits (ASICs), and/or one or more field programmable gate arrays (FPGAs).

The network equipment 12 may include a power source 1050. The power source 1050 may be a battery or other power supply circuitry, as well as power management circuitry. The power supply circuitry may receive power from an external source. A battery, other power supply circuitry, and/or power management circuitry are connected to radio circuitry (e.g. radio front-end circuitry) 1010, processing circuitry 1020, and/or memory 1030. The power source 1050, battery, power supply circuitry, and/or power management circuitry are configured to supply radio network node 12, including processing circuitry 1020, with power for performing the functionality described herein.

A network equipment 12, NE, comprises processing circuitry 1020 and radio circuitry 1010, wherein the NE 12 is configured to transmit a signal pertaining to if control information is present in a first time period and transmit control information to a UE in accordance with the transmitted signal. The NE and/or any of the components and/or circuitry of the NE may be further configured to perform the methods as disclosed herein.

Figure 14:
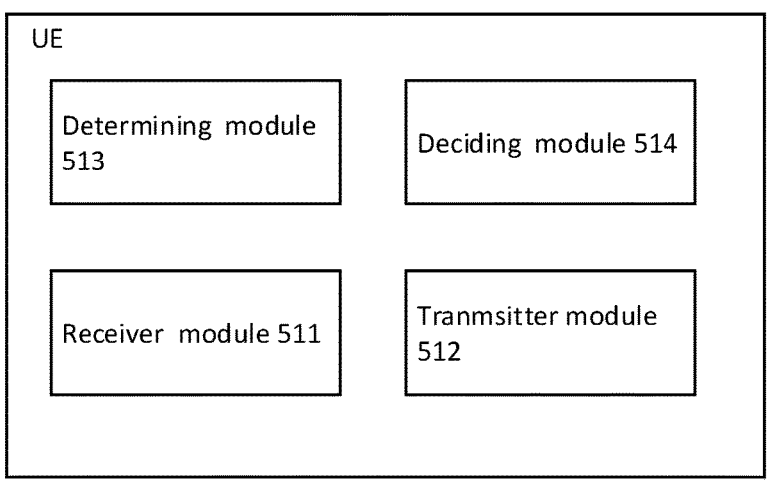
FIG. 14 is a block schematic of an exemplary user equipment, in accordance with certain embodiments

As shown in FIG. 14, the user equipment comprises a receiving module 511, or receiver (RX), and a transmitting module 512, or transmitter (TX), over which the user equipment may transmit/receive signals to other nodes, such as, e.g. the network equipment or other user equipments. The receiving and transmitting modules 511, 512 may also be incorporated into a single transceiver or communications unit. Also, the user equipment may comprise a determining module 513 configured to, for example, determining if a signal pertaining to control information is present in a first time period. The user equipment may comprise a deciding module 514 configured to, for example, deciding whether to attempt to decode the control information depending on determination. It should also be noted that the user equipment may comprise further modules for configuring downlink reception transmissions in the wireless communications network 100 according to the embodiments described herein.

The invention claimed is:

1. A method for a user equipment, UE, comprising
determining if a signal pertaining to control information is received in a first time period, wherein the signal indicates whether control information is present; and
deciding whether to attempt to decode the control information depending on the determination,
wherein the signal comprises a sequence of symbols, where a length of the sequence depends on the maximum length of a control channel search space of a control channel carrying the control information.

2. The method according to claim 1, wherein the method comprises receiving an indication whether the signal will be used or not for indicating a presences of control information intended for the UE in a System Information message.

3. A user equipment, UE, comprising processing circuitry and radio circuitry, wherein the UE is configured to:
determine if a signal pertaining to control information is received in a first time period, wherein the signal indicates whether control information is present; and
decide whether to attempt to decode the control information depending on the determination,
wherein the signal comprises a sequence of symbols, where a length of the sequence depends on the maximum length of a control channel search space of a control channel carrying the control information.

4. The UE according to claim 3, wherein the UE is further configured to receive an indication whether the signal will be used or not for indicating a presences of control information intended for the UE in a System Information message.

* * * * *